(12) United States Patent
Chen

(10) Patent No.: US 10,307,918 B2
(45) Date of Patent: Jun. 4, 2019

(54) PIPE SHEARS WITH A REPLACEABLE CUTTER BLADE

(71) Applicant: LYCRS INDUSTRIES CO. LTD., Taichung (TW)

(72) Inventor: Chu-Tsai Chen, Taichung (TW)

(73) Assignee: Lycrs Industries Co., Ltd., Taichung (TW)

( * ) Notice: Subject to any disclaimer, the term of this patent is extended or adjusted under 35 U.S.C. 154(b) by 2 days.

(21) Appl. No.: 15/867,161

(22) Filed: Jan. 10, 2018

(65) Prior Publication Data

US 2018/0222065 A1    Aug. 9, 2018

(30) Foreign Application Priority Data

Feb. 8, 2017    (TW) .............................. 106104106 A

(51) Int. Cl.
| B26B 13/04 | (2006.01) |
| B26D 3/16 | (2006.01) |
| B26B 13/28 | (2006.01) |
| B26B 13/26 | (2006.01) |
| B23D 29/02 | (2006.01) |
| B23D 21/10 | (2006.01) |

(52) U.S. Cl.
CPC ............. *B26B 13/04* (2013.01); *B26B 13/26* (2013.01); *B26B 13/28* (2013.01); *B26D 3/169* (2013.01); *B23D 21/10* (2013.01); *B23D 29/023* (2013.01)

(58) Field of Classification Search
CPC ......... B26B 13/04; B26B 13/26; B26B 13/28; B23D 21/10; B23D 29/023; B26D 3/169
USPC ..................................................... 30/92, 254
See application file for complete search history.

(56) References Cited

U.S. PATENT DOCUMENTS

| 5,862,593 | A | * | 1/1999 | Huang | B23D 21/06 |
| | | | | | 30/182 |
| 7,743,509 | B2 | * | 6/2010 | Macsay | B26D 3/169 |
| | | | | | 30/192 |
| 9,179,605 | B2 | * | 11/2015 | Yamaoka | A01G 3/037 |
| 9,616,508 | B2 | * | 4/2017 | Han | B23D 21/06 |
| 2018/0222065 | A1 | * | 8/2018 | Chen | B26B 13/04 |
| 2018/0326513 | A1 | * | 11/2018 | Chen | B26D 3/169 |
| 2018/0354044 | A1 | * | 12/2018 | Nordlin | B23D 29/002 |

FOREIGN PATENT DOCUMENTS

| WO | WO 2008/154109 A1 * 12/2008 |
| WO | WO 2018/120841 A1 *  7/2018 |

\* cited by examiner

*Primary Examiner* — Hwei-Siu C Payer
(74) *Attorney, Agent, or Firm* — Muncy, Geissler, Olds & Lowe, P.C.

(57) ABSTRACT

A pipe shears includes a base, a ratchet plate pivotally connected to the base, a cutter blade detachably mounted to the ratchet plate, a positioning member mounted between an elongated hole of the ratchet plate and a positioning groove of the cutter blade, and a push rod inserted in the base and stopped against a stop member. When the push rod is not pushed, it is positioned in the elongated hole of the ratchet plate and stopped against the positioning member to force the positioning member into engagement with the positioning groove of the cutter blade, and the cutter blade is not detachable at this time. When the push rod is pushed, the stop member is moved out of the elongated hole of the ratchet plate to unlock the positioning member from the positioning groove of the cutter blade for allowing removal of the cutter blade.

9 Claims, 5 Drawing Sheets

PIPE SHEARS WITH A REPLACEABLE CUTTER BLADE

BACKGROUND OF THE INVENTION

1. Field of the Invention

The present invention relates to pipe or wire cutting tools and more particularly, to a pipe shears that facilitates quick replacement of the cutter blade.

2. Description of the Related Art

A pipe shears for use in piping engineering mainly comprises two handles pivotally connected to each other. One handle has a cutter blade provided at the top side thereof. The other handle has a bearing block provided at the top side thereof. When biasing the two handles relative to each other, a linking mechanism between the two handles is actuated, enabling the cutter blade to move over the bearing block and to cut off the workpiece.

Most of conventional pipe shears do not have a cutter blade replaceable function. Those conventional pipe shears that allow replacement of the cutter blade commonly use a complicated linking mechanism that consists of many components. The cutter blade dismounting process makes the user very laborious, easily leading to pain and discomfort in both hands. Therefore, the conventional technology cannot allow the user to quickly detach the cutter blade, and there is room for improvement.

SUMMARY OF THE INVENTION

The present invention has been accomplished under the circumstances in view. It is the main object of the present invention to provide a pipe shears, which allows the user to rapidly and conveniently replace the cutter blade, increasing convenience of use.

To achieve this and other objects of the present invention, a pipe shears comprises a base, a movable handle, a linking device set, a cutter blade and a positioning device set. The base comprises a first grip, a cutter blade mounting portion connected to the first grip, a first pivot connection portion connected to the cutter blade mounting portion, a slot located on the cutter blade mounting portion and an axle hole located on the cutter blade mounting portion and extended across the slot. The movable handle comprises a second grip, and a second pivot connection portion connected to the second grip and pivotally connected to the first pivot connection portion of the base. The linking device set comprises a ratchet plate, an abutment member and a return spring. The ratchet plate is pivotally connected to the cutter blade mounting portion of the base, comprising an elongated hole. The elongated hole defines a close and an open end. The abutment member has one end thereof mounted to the second pivot connection portion of the movable handle, and an opposite end thereof engaged with the ratchet plate so that the abutment member is biasable by the movable handle toward the base to push the ratchet plate. The return spring is adapted for imparting an elastic restoring force to the ratchet plate. The cutter blade is detachably inserted into the slot on the cutter blade mounting portion of the base, comprising a positioning groove linked to the open end of the elongated hole of the ratchet plate. The positioning device set comprises a positioning member, a first push rod and a stop member. The positioning member is movably mounted between the elongated hole of the ratchet plate and the positioning groove of the cutter blade. The first push rod is axially inserted in the axle hole of the base and movable between a positioning position and a detachment position. The stop member is stopped at a distal end of the first push rod. When the first push rod is disposed in the positioning position, the stop member is positioned in the elongated hole of the ratchet plate and stopped against the positioning member to force the positioning member into engagement with the positioning groove of the cutter blade, thereby locking the cutter blade to the ratchet plate. On the contrary, when the first push rod is disposed in the detachment position, the stop member is disengaged from the elongated hole of the ratchet plate and separated from the positioning member, causing disengagement of the positioning member from the positioning groove of the cutter blade for allowing removal of the cutter blade from the ratchet plate.

Preferably, the first push rod comprises a neck for supporting the positioning member as the first push rod is disposed in the detachment position. The first push rod further comprises a first flange connected to the neck and a push portion connected to the first flange. The positioning device set further comprises a first push rod cap and a first push rod spring. The first push rod cap is mounted at one lateral side of the cutter blade mounting portion of the base, defining therein a first through hole for the insertion of the push portion of the first push rod. The first push rod spring is mounted around the neck of the first push rod and stopped between the base and the first flange of the first push rod to keep the first push rod in the positioning position.

Preferably, the first push rod comprises a first abutment portion located at one end thereof; the positioning device set further comprises a second push rod. The second push rod comprises a second abutment portion located at one end thereof. The first push rod and the second push rod are respectively and axially movably inserted into two opposite ends of the axle hole of the base. The stop member is mounted between the first abutment portion of the first push rod and the second abutment portion of the second push rod. The second push rod further comprises a second flange connected to the second abutment portion and a shank connected to the second flange. The positioning device set further comprises a second push rod cap and a second push rod spring. The second push rod cap is mounted at the cutter blade mounting portion of the base opposite to the first push rod, defining therein a second through hole for the insertion of the shank of the second push rod. The second push rod spring is mounted around the shank of the second push rod and stopped between the second flange of the second push rod and the second push rod cap for returning the second push rod.

Preferably, the ratchet plate comprises a clamping slot disposed in communication with the open end of the elongated hole. The cutter blade comprises a retaining portion, and a positioning groove located on the retaining portion. When mounting the cutter blade, the retaining portion is engaged into the clamping slot of the ratchet plate.

Preferably, the second pivot connection portion of the movable handle has a check member pivotally connected thereto. The check member is biased toward the ratchet plate by a check spring so that the check member is kept in engagement with the ratchet plate, prohibiting the ratchet plate from reverse rotation during the cutting operation.

Other advantages and features of the present invention will be fully understood by reference to the following specification in conjunction with the accompanying drawings, in which like reference signs denote like components of structure.

DETAILED DESCRIPTION OF THE INVENTION

Figure 1:
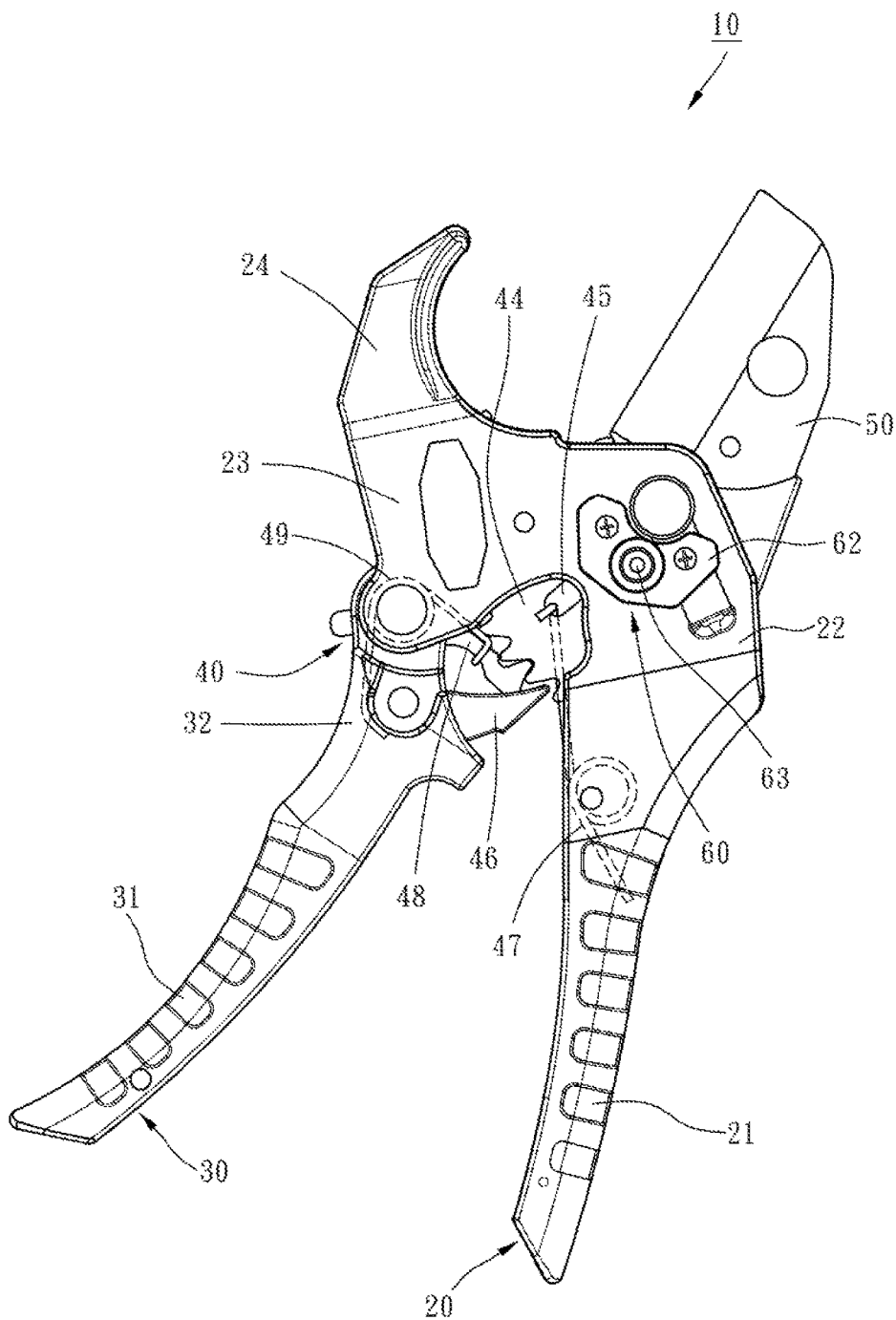
FIG. 1 is a schematic plain view of a pipe shears in accordance with the present invention.
Figure 2:
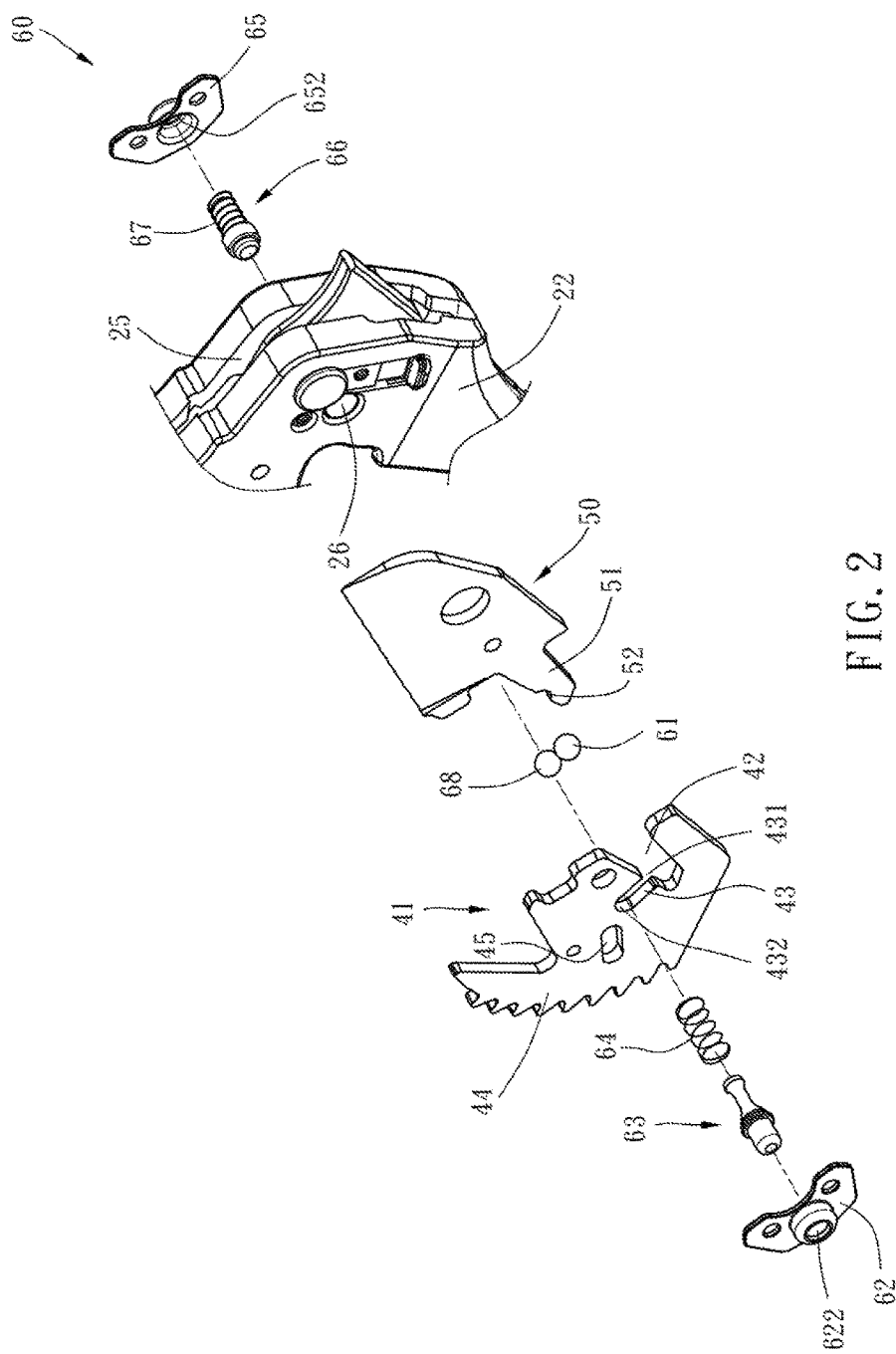
FIG. 2 is an exploded view of a part of the pipe shears in accordance with the present invention.

Referring to FIGS. 1 and 2, a pipe shears 10 in accordance with the present invention is shown. The pipe shears 10 comprises a base 20, a movable handle 30, a linking device set 40, a cutter blade 50, and a positioning device set 60.

The base 20 comprises a first grip 21, a cutter blade mounting portion 22 connected to the first grip 21, a first pivot connection portion 23 connected to the cutter blade mounting portion 22, a cutter blade abutment portion 24 connected to the first pivot connection portion 23, a slot 25 located on the cutter blade mounting portion 22, and an axle hole 26 located on the cutter blade mounting portion 22 and transversely extended across the slot 25.

The movable handle 30 comprises a second grip 31, and a second pivot connection portion 32 connected to the second grip 31. The second pivot connection portion 32 is pivotally connected to the first pivot connection portion 23 of the base 20 so that the movable handle 30 is biasable toward the base 20 by an external force.

The linking device set 40 comprises a ratchet plate 41, an abutment member 46 and a return spring 47. The ratchet plate 41 is pivotally connected to the cutter blade mounting portion 22 of the base 20, comprising a clamping slot 42 and an elongated hole 43 respectively located on one lateral side thereof. The elongated hole 43 is disposed in communication with the axle hole 26 of the base 20, defining an open end 431 and an opposing close end 432. The open end 431 of the elongated hole 43 is disposed in communication with the clamping slot 42. The ratchet plate 41 further comprises a ratchet teeth portion 44 located on an opposite lateral side thereof. The ratchet teeth portion 44 partially exposed to the outside of the slot 25 of the cutter blade mounting portion 22 of the base 20. The ratchet plate 41 further comprises a hook hole 45 disposed between the elongated hole 43 and the ratchet teeth portion 44. The abutment member 46 has one end thereof affixed to the second pivot connection portion 32 of the movable handle 30, and an opposite end thereof engaged with the ratchet teeth portion 44 of the ratchet plate 41. Thus, the abutment member 46 can be driven to push the ratchet plate 41 upon biasing of the movable handle 30 toward the base 20. The return spring 47 (such as torsion spring as illustrated in the drawings) is mounted in the first grip 21 of the base 20, having one end thereof abutted against the base 20 and an opposite end thereof hooked in the hook hole 45 of the ratchet plate 41. Thus, the return spring 47 can provide an elastic restoring force to the ratchet plate 41.

The linking device set 40 further comprises a check member 48 and a check spring 49. The check member 48 has one end thereof pivotally connected to the second pivot connection portion 32 of the movable handle 30, and an opposite end thereof engaged with the ratchet teeth portion 44 of the ratchet plate 41. The check spring 49 (such as torsion spring as illustrated in the drawings) is mounted in the second pivot connection portion 32 of the movable handle 30, having one end thereof abutted against the movable handle 30 and an opposite end thereof abutted against a bottom edge of the check member 48. Thus, the check member 48 can be forced by the spring force of the check spring 49 to bias toward the ratchet plate 41 into engagement with the ratchet teeth portion 44 of the ratchet plate 41, prohibiting the ratchet plate 41 from reverse rotation subject to the spring force of the return spring 47.

The cutter blade 50 is plugged with a bottom end thereof into the slot 25 of the cutter blade mounting portion 22 of the base 20, comprising a retaining portion 51 extended from the bottom end and engaged in the clamping slot 42 of the ratchet plate 41 for allowing movement of the cutter blade 50 with the ratchet plate 41. The cutter blade 50 and a positioning groove 52 located on the retaining portion 51 and connected to the open end 431 of the elongated hole 43 of the ratchet plate 41. It is worth mentioning that the cutter blade 50 in the present preferred embodiment is a flat edge cutter blade for cutting pipes. A corner edge cutter blade can be selectively used to substitute for the flat edge cutter blade for cutting wires.

The positioning device set 60 comprises a positioning member 61, a first push rod cap 62, a first push rod 63, a first push rod spring 64, a second push rod cap 65, a second push rod 66, a second push rod spring 67 and a stop member 68.

The positioning member 61 (such as rolling ball as shown in FIG. 2) is rotatably mounted between the elongated hole 43 of the ratchet plate 41 and the positioning groove 52 of the cutter blade 50.

The first push rod cap 62 is affixed to one lateral side of the cutter blade mounting portion 22 of the base 20, comprising a first through hole 622 aimed at one end of the axle hole 26 of the base 20.

Figure 3:
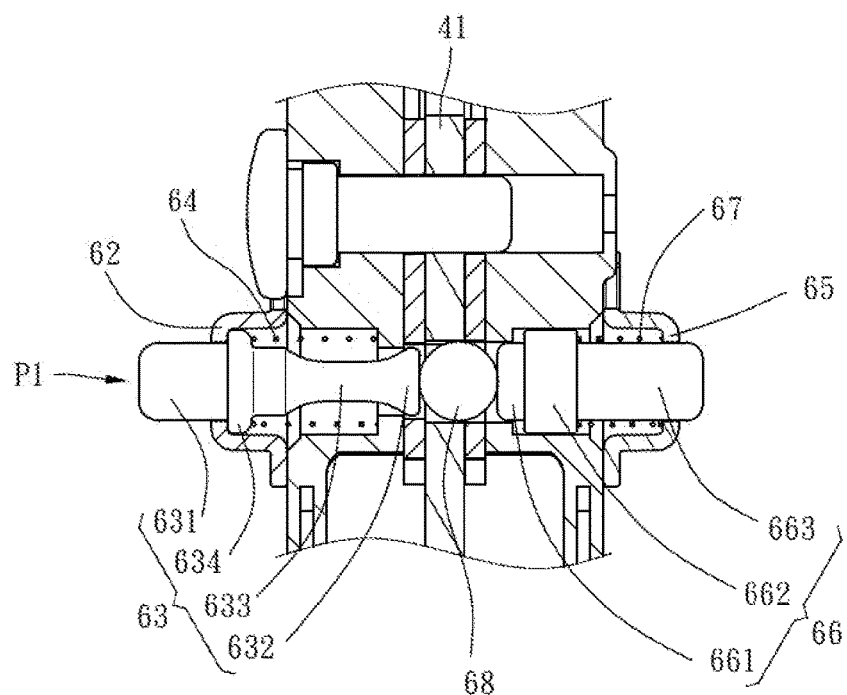
FIG. 3 is a sectional view of the present invention, illustrating the first push rod in the positioning position.

As illustrated in FIGS. 2 and 3, the first push rod 63 comprises a push portion 631 located at one end thereof and protruding over the first push rod cap 62 through the first through hole 622 for pushing by the user, a first abutment portion 632 located at an opposite end thereof and disposed in the axle hole 26 of the base 20, a neck 633 connected to the first abutment portion 632 and a first flange 634 connected to the push portion 631 and the neck 633. The neck 633 is disposed in the axle hole 26 of the base 20. The first flange 634 is stopped against an end wall of the first push rod cap 62 to prohibit the first push rod 63 from escaping out of the first push rod cap 62.

The first push rod spring 64 is adapted to impart an elastic restoring force to the first push rod 63. The first push rod spring 64 is mounted around the neck 633 of the first push rod 63 with one end thereof stopped against the hole wall of the axle hole 26 of the base 20 and an opposite end thereof stopped against the first flange 634 of the first push rod 63.

The second push rod cap 65 is affixed to an opposite lateral side of the cutter blade mounting portion 22 of the base 20, comprising a second through hole 652 aimed at the other end of the axle hole 26 of the base 20.

The second push rod 66 comprises a second abutment portion 661 located at one end thereof and disposed in the axle hole 26 of the base 20, a second flange 662 connected to the second abutment portion 661 and a shank 663 connected to the second flange 662. The second flange 662 is disposed in the axle hole 26 of the base 20. The shank 663 is inserted through the second through hole 652 of the second push rod cap 65.

The second push rod spring 67 is adapted to impart an elastic restoring force to the second push rod 66. The second push rod spring 67 is mounted around the shank 663 of the second push rod 66 and stopped between the second flange 662 of the second push rod 66 and an end wall of the second push rod cap 65.

The stop member 68 (such as rolling ball shown in FIG. 2) is stopped between the first abutment portion 632 of the first push rod 63 and the second abutment portion 661 of the second push rod 66. Thus, the stop member 68 can be pushed by the first push rod 63 and can also be pushed by the second push rod 66.

Figure 4:
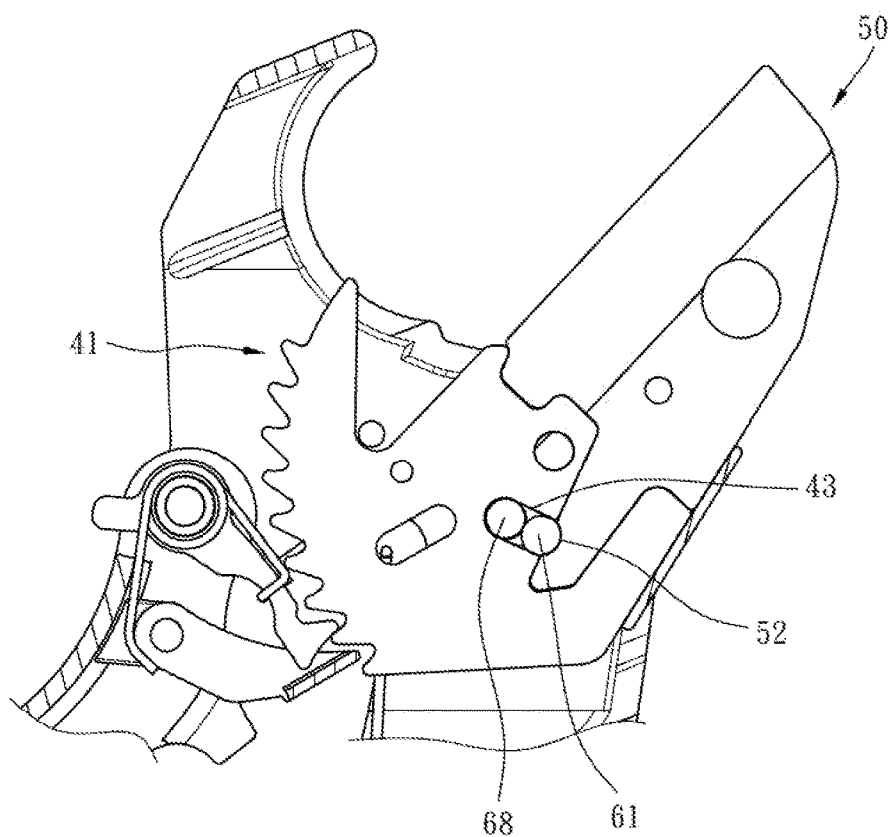
FIG. 4 is another sectional view of the present invention, illustrating the positioning member engaged in the positioning groove of the cutter blade.

Referring to FIGS. 3 and 4, when the first push rod 63 is located at a positioning position P1 without external force, the stop member 68 is kept in the elongated hole 43 of the ratchet plate 41, thus, the positioning member 61 is stopped by the strop member 68 and engaged in the positioning groove 52 of the cutter blade 50. At this time, the cutter blade 50 and the ratchet plate 41 are secured together. When the user presses the movable handle 30 at this time, the movable handle 30 is forced to push the ratchet plate 41 through the abutment member 46, causing the ratchet plate 41 to move the cutter blade 50 in performing a cutting operation.

Figure 5:
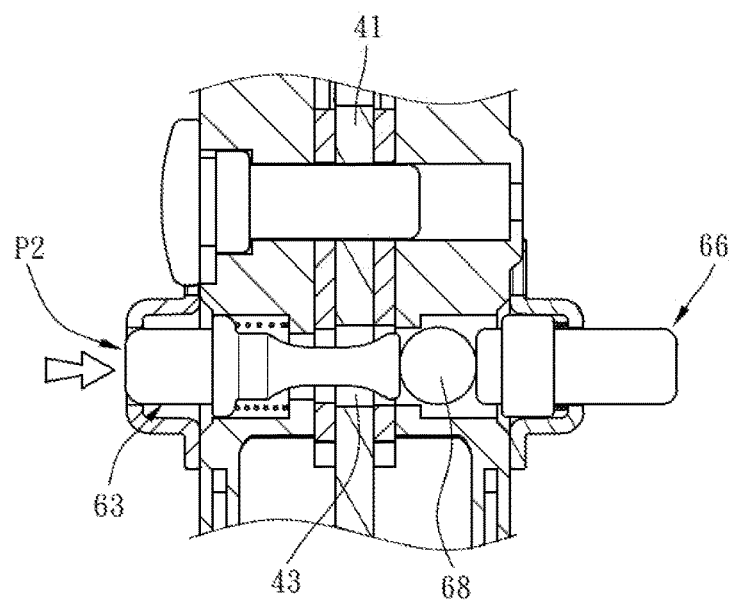
FIG. 5 is similar to FIG. 3, illustrating the first push rod in the detachment position.
Figure 6:
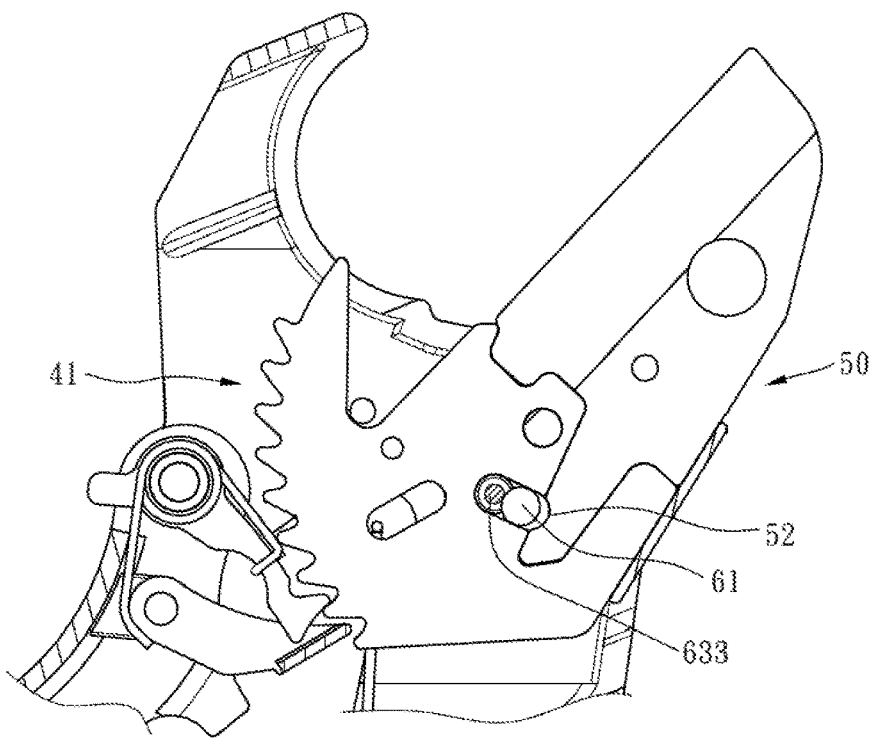
FIG. 6 is similar to FIG. 4, illustrating the positioning member disengaged from the positioning groove of the cutter blade.

Referring to FIGS. 5 and 6, when the first push rod 63 is pushed to a detachment position P2 by an external force, the stop member 68 is moved away from the elongated hole 43 of the ratchet plate 41 by the first push rod 63 to release the positioning member 61 from constraint. At this time, the positioning member 61 is disengaged from the positioning groove 52 of the cutter blade 50 and rested on the neck 633 of the first push rod 63, allowing removal of the cutter blade 50 from the ratchet plate 41 for replacement. When replacing the cutter blade 50, the first push rod 63 must be kept in the detachment position P2. After replacement of the cutter blade 50, release the pressure from the first push rod 63 for enabling the first push rod 63 to be returned to the positioning position P1 subject to the elastic restoring energy of the first push rod spring 64. At this time, the second push rod 66 is forced by the spring force of the second push rod spring 67 to push the stop member 68 back into the inside of the elongated hole 43 of the ratchet plate 41, forcing the positioning member 61 into engagement with the positioning groove 52 of the cutter blade 50 again, and thus, the new cutter blade 50 is locked in position.

It is to be noted that the axle hole 26 of the base 20 and the elongated hole 43 of the ratchet plate 41 are disposed in communication with each other before the cutting operation. At this time, the user can press the first push rod 63 to detach the cutter blade 50. However, after the user forced the movable handle 30 to drive the ratchet plate 41 in carrying the cutter blade 50 for cutting, the elongated hole 43 of the ratchet plate 41 is offset from the axle hole 26 of the base 20 to assume a disconnected state so that the first push rod 63 and the stop member 68 are separated from each other. It can be seen from the above that the first push rod 63 cannot be pushed during shearing of the cutter blade 50 so that the cutter blade 50 cannot be disassembled. In other words, the positioning device 60 not only provides a convenient disassembly and positioning effect on the cutter blade 50, but also provides a fool-proof effect to prevent the cutter blade 50 from being detached due to that the user inadvertently presses the first push rod 63 during the cutting operation.

In conclusion, the pipe shears 10 of the present invention uses the mating arrangement between the first push rod 63 and the stop member 68 to control positioning or separation between the positioning member 61 and the cutter blade 50, facilitating quick detachment of the cutter blade 50. When compared with the conventional technology, the invention can indeed achieve the purpose of increasing the convenience of use.

What is claimed is:

1. A pipe shears, comprising:
    a base comprising a first grip, a cutter blade mounting portion connected to said first grip, a first pivot connection portion connected to said cutter blade mounting portion, a slot located on said cutter blade mounting portion and an axle hole located on said cutter blade mounting portion and extended across said slot;
    a movable handle comprising a second grip and a second pivot connection portion connected to said second grip and pivotally connected to said first pivot connection portion of said base;
    a linking device set comprising a ratchet plate, an abutment member and a return spring, said ratchet plate being pivotally connected to said cutter blade mounting portion of said base and comprising an elongated hole, said elongated hole defining a close end and an open end, said abutment member having one end thereof mounted to said second pivot connection portion of said movable handle and an opposite end thereof engaged with said ratchet plate so that said abutment member is biasable by said movable handle toward said base to push said ratchet plate, said return spring being adapted for imparting an elastic restoring force to said ratchet plate;
    a cutter blade detachably inserted into said slot on said cutter blade mounting portion of said base, said cutter blade comprising a positioning groove linked to said open end of said elongated hole of said ratchet plate; and
    a positioning device set comprising a positioning member, a first push rod and a stop member, said positioning member being movably mounted between said elongated hole of said ratchet plate and said positioning groove of said cutter blade, said first push rod being axially inserted in said axle hole of said base and movable between a positioning position and a detachment position, said stop member being stopped at a distal end of said first push rod;
    wherein when said first push rod is disposed in said positioning position, said stop member is positioned in said elongated hole of said ratchet plate and stopped against said positioning member to force said positioning member into engagement with said positioning groove of said cutter blade, thereby locking said cutter blade to said ratchet plate; when said first push rod is disposed in said detachment position, said stop member is disengaged from said elongated hole of said ratchet plate and separated from said positioning member, causing disengagement of said positioning member from said positioning groove of said cutter blade for allowing removal of said cutter blade from said ratchet plate.

2. The pipe shears as claimed in claim 1, wherein said first push rod comprises a first abutment portion located at one end thereof; said positioning device set further comprises a second push rod, said second push rod comprising a second abutment portion located at one end thereof; said first push rod and said second push rod are respectively and axially movably inserted into two opposite ends of said axle hole of said base; said stop member is mounted between said first abutment portion of said first push rod and said second abutment portion of said second push rod.

3. The pipe shears as claimed in claim 2, wherein said second push rod further comprises a second flange connected to said second abutment portion and a shank connected to said second flange; said positioning device set further comprises a second push rod cap and a second push rod spring, said second push rod cap being mounted at said cutter blade mounting portion of said base opposite to said first push rod and defining therein a second through hole for the insertion of said shank of said second push rod, said second push rod spring being mounted around said shank of said second push rod and stopped between said second flange of said second push rod and said second push rod cap.

4. The pipe shears as claimed in claim 1, wherein said first push rod comprises a neck for supporting said positioning member as said first push rod is disposed in said detachment position.

5. The pipe shears as claimed in claim 4, wherein said first push rod further comprises a first flange connected to said neck and a push portion connected to said first flange; said positioning device set further comprises a first push rod cap and a first push rod spring, said first push rod cap being mounted at one lateral side of said cutter blade mounting portion of said base and defining therein a first through hole for the insertion of said push portion of said first push rod, said first push rod spring being mounted around said neck of said first push rod and stopped between said base and said first flange of said first push rod.

6. The pipe shears as claimed in claim 1, wherein said ratchet plate comprises a clamping slot disposed in communication with said open end of said elongated hole; said cutter blade comprises a retaining portion and said positioning groove located on said retaining portion, said retaining portion being detachably engaged in said clamping slot of said ratchet plate.

7. The pipe shears as claimed in claim 1, wherein said linking device set further comprises a check member and a check spring, said check member having one end thereof pivotally connected to said second pivot connection portion of said movable handle and an opposite end thereof engaged with said ratchet plate, said check spring being adapted for biasing said check member toward said ratchet plate.

8. The pipe shears as claimed in claim 1, wherein said positioning member is a rolling ball.

9. The pipe shears as claimed in claim 1, wherein said stop member is a rolling ball.

\* \* \* \* \*